United States Patent
Ezrielev et al.

(10) Patent No.: US 12,488,094 B2
(45) Date of Patent: Dec. 2, 2025

(54) SYSTEM AND METHOD FOR MEMORY-LESS ANOMALY DETECTION

(71) Applicant: Dell Products L.P., Round Rock, TX (US)

(72) Inventors: Ofir Ezrielev, Beer Sheva (IL); Avitan Gefen, Tel Aviv (IL); Nadav Azaria, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 6 days.

(21) Appl. No.: 17/938,758

(22) Filed: Oct. 7, 2022

(65) Prior Publication Data

US 2024/0119141 A1    Apr. 11, 2024

(51) Int. Cl.
*G06F 21/55*    (2013.01)

(52) U.S. Cl.
CPC ...... *G06F 21/552* (2013.01); *G06F 2221/034* (2013.01)

(58) Field of Classification Search
CPC .... G06F 21/566; G06F 21/552; G06F 21/554; G06F 21/56; G06F 2221/034; G06N 20/00
See application file for complete search history.

(56) References Cited

U.S. PATENT DOCUMENTS

| | | | |
|---|---|---|---|
| 9,097,542 B2 | 8/2015 | Morlock et al. | |
| 11,449,786 B2 * | 9/2022 | Gottschlich | G06N 20/00 |
| 11,720,464 B1 | 8/2023 | Ezrielev | |
| 12,182,670 B1 * | 12/2024 | Beauchesne | H04L 63/1416 |
| 2016/0226894 A1 | 8/2016 | Lee | |
| 2019/0138423 A1 * | 5/2019 | Agerstam | G06F 11/3466 |
| 2019/0188065 A1 | 6/2019 | Anghel | |
| 2020/0285737 A1 | 9/2020 | Kraus | |
| 2020/0293870 A1 * | 9/2020 | Isikdogan | G06V 10/70 |
| 2020/0334578 A1 | 10/2020 | Ikeda | |
| 2020/0364561 A1 | 11/2020 | Ananthanarayanan | |
| 2021/0048994 A1 | 2/2021 | Yu | |
| 2021/0064933 A1 | 3/2021 | Bos | |
| 2021/0097433 A1 | 4/2021 | Olgiati | |
| 2021/0133607 A1 | 5/2021 | Stubbs | |
| 2021/0144211 A1 | 5/2021 | Schnieders | |

(Continued)

OTHER PUBLICATIONS

Pang, Guansong, et al. "Deep Learning for Anomaly Detection: A Review", ACM Comput. Surv., vol. 1, No. 1, Article 1, Jan. 2020. arXiv:2007.02500v3 [cs.LG] Dec. 5, 2020. 36 pages.

(Continued)

*Primary Examiner* — Daniel B Potratz
(74) *Attorney, Agent, or Firm* — WOMBLE BOND DICKINSON (US) LLP (57) ABSTRACT

Methods and systems for anomaly detection in a distributed environment are disclosed. To manage anomaly detection, a system may include an anomaly detector and one or more data collectors. The anomaly detector may detect anomalies in data obtained from one or more of the data collectors using an inference model. To perform anomaly detection, the inference model may require periodic re-training. Data collected from the one or more data collectors may be used to re-train the inference model as needed. Following anomaly detection and/or inference model re-training, the data may be discarded to remove the data from the anomaly detector.

20 Claims, 7 Drawing Sheets

(56) References Cited

U.S. PATENT DOCUMENTS

| | | |
|---|---|---|
| 2021/0182556 A1 | 6/2021 | Klug |
| 2021/0203576 A1 | 7/2021 | Padfield |
| 2022/0004921 A1 | 1/2022 | Balaraman |
| 2022/0027083 A1 | 1/2022 | Zuolo |
| 2022/0030019 A1* | 1/2022 | Neuvirth ............ G06F 16/2477 |
| 2022/0171863 A1 | 6/2022 | Green |
| 2022/0172067 A1 | 6/2022 | Kang |
| 2022/0188694 A1 | 6/2022 | Suzani |
| 2022/0201490 A1* | 6/2022 | Sedjelmaci ......... H04L 63/1416 |
| 2022/0329613 A1 | 10/2022 | Abbasazadeh |
| 2022/0374677 A1 | 11/2022 | Wang et al. |
| 2022/0382622 A1 | 12/2022 | Ye |
| 2022/0391724 A1 | 12/2022 | Yoon |
| 2022/0400121 A1 | 12/2022 | Han |
| 2022/0417274 A1 | 12/2022 | Madanahalli |
| 2023/0004863 A1* | 1/2023 | Kanishima ............ G06N 3/084 |
| 2023/0162038 A1 | 5/2023 | Qi |
| 2023/0169147 A1 | 6/2023 | Sivakumar |
| 2023/0229550 A1 | 7/2023 | Zhao |
| 2023/0289660 A1 | 9/2023 | Shi |
| 2023/0325725 A1 | 10/2023 | Lester |
| 2023/0385456 A1 | 11/2023 | Beauregard et al. |
| 2023/0412627 A1 | 12/2023 | Szilagyi et al. |
| 2024/0046152 A1 | 2/2024 | Lehmann |
| 2024/0095906 A1 | 3/2024 | Gudovskiy |
| 2024/0104201 A1 | 3/2024 | Makovoz |

OTHER PUBLICATIONS

Finke, Thorben, et al. "Autoencoders for unsupervised anomaly detection in high energy physics", Institute for Theoretical Particle Physics and Cosmology (TTK), RWTH Aachen University, D-52056 Aachen, Germany. arXiv:2104.09051v1 [hep-ph] Apr. 19, 2021. 32 pages.

Nassif et al., "Machine Learning for Anomaly Detection: A Systematic Review", IEEE Access, 2021, vol. 9, pp. 78658-78700 (43 pages).

Nivarthi et al., "Towards Few-Shot Time Series Anomaly Detection with Temporal Attention and Dynamic Thresholding," 2023 International Conference on Machine Learning and Applications (ICMLA), pp. 1444~p. 1450 (Year: 2023).

He et al., "Unsupervised Log Anomaly Detection Based on Pretraining", 2023 9th International Conference on Systems and Informatics (ICSAI), 6 pages (Year: 2023).

* cited by examiner

SYSTEM AND METHOD FOR MEMORY-LESS ANOMALY DETECTION

FIELD

Embodiments disclosed herein relate generally to anomaly detection. More particularly, embodiments disclosed herein relate to systems and methods to reduce computing resource expenditure and increase data security while performing anomaly detection.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for anomaly detection in a distributed environment using an inference model. To perform anomaly detection in a distributed environment, the system may include an anomaly detector. The anomaly detector may host and operate the inference model while re-training the inference model as needed. These operations (e.g., hosting, operating, and re-training an inference model) may require large quantities of computing resources of a device (e.g., more computing resources than desirable and/or available to the device) and may, in some embodiments, require storage of large amounts of data on the device as training data. Storing large amounts of data on the device may leave the data vulnerable to malicious attacks by unauthorized entities (e.g., attackers who desire access to the data).

To bolster data security, the anomaly detector may re-train the inference model as needed (e.g., when input values do not generate an expected output value when non-anomalous) and subsequently discard (e.g., remove from the device) the data used to re-train the inference model. In addition, other data obtained from the one or more data collectors (e.g., data including anomalies and/or any other data not used to re-train the inference model) may also be discarded. By doing so, the anomaly detector may perform memory-less anomaly detection (e.g., detection of anomalies in data without maintaining data in any memory or storage device). Therefore, even in the event of an unauthorized entity (e.g., an attacker) gaining access to the device, the attacker may not access the data.

In addition, to reduce computing resource consumption during anomaly detection, the inference model may be trained to map input data to one output value, thereby enabling the inference model to perform unsupervised anomaly detection and, therefore, reducing the quantity of computing resources required by the device to host and operate the inference model when compared to an anomaly detection algorithm requiring comparison of new data to existing (e.g., stored) data. Furthermore, the re-training of the inference model may include a partial re-training process. Partial re-training of the inference model may include freezing (e.g., rendering unaffected by the re-training of the inference model) portions of the inference model. By doing so, only portions of the inference model not included in the frozen portion may be modified during the re-training process. Partial re-training of the inference model may utilize fewer computing resources (e.g., by only re-training a portion of the inference model rather than the entire inference model).

To perform memory-less anomaly detection, the anomaly detector may obtain data from one or more data collectors within a distributed environment. The anomaly detector may determine whether the data includes an anomaly using the inference model. To determine if the data includes an anomaly, an inference may be obtained, the inference being intended to match a fixed output value when the data is not anomalous. A difference may then be obtained (e.g., a difference between the inference and the fixed output value. If the difference is above an anomaly threshold, the data may be classified as anomalous data and a process may be initiated (e.g., an action set that may include an action taken by the anomaly detector itself, notifying a downstream consumer that the data includes anomalous data, and/or other actions). The process may include discarding the data following performance of the action set.

If the difference is within the anomaly threshold, the data may not include anomalous data. However, the data may be used to determine whether the inference model requires re-training. The inference model may require re-training if the data falls outside a calibration threshold for the inference model. Data that falls outside the calibration threshold may indicate that the inference model no longer maps non-anomalous input values to a fixed output value as expected. In this example, the data may no longer comply with the needs of the downstream consumer. The data may then be treated as training data and used to re-train (through the partial re-training process described above) the inference model to obtain an updated inference model. The updated inference model may generate inferences more likely to discover anomalies given a changed environment which is now considered non-anomalous. As discussed above, all data (data used to re-train the inference model or otherwise) may be discarded to increase data security.

Thus, embodiments disclosed herein may provide an improved system for performing anomaly detection while securing data desired by attackers and minimizing computing resource expenditure on devices within a distributed environment. The system may improve data security on devices by not locally storing any data, thereby rendering the data unavailable to attackers. In addition, the device hosting the inference model may perform a partial re-training process (when re-training is needed) and, therefore, may not update the entire inference model. By doing so, fewer computing resources may be required to host, operate, and update the inference model on the device.

In an embodiment, a method of processing data is provided.

The method may include obtaining, by an anomaly detector, data from a data collector; obtaining, by the anomaly detector, an inference using an inference model, the inference being intended to match a fixed output value when the data is not anomalous; making a first determination, by the anomaly detector, regarding whether the data is anomalous, the first determination being based at least in part on the inference; and in a first instance of the first determination where the data is anomalous, initiating a process based on the data being anomalous.

The method may also include: in a second instance of the first determination where the data is not anomalous: making a second determination, by the anomaly detector, regarding whether the data is useful to improve anomaly detection capabilities of the inference model through training; in a first instance of the second determination where the data is useful, re-training, by the anomaly detector, the inference model using the data as training data to obtain an updated inference model and discarding the data; and in a second instance of the second determination where the data is not useful, discarding the data without using the data for inference model updating purposes.

Making the first determination may also include: obtaining a difference, the difference being based on the inference and the fixed output value; making a third determination regarding whether the difference is within an anomaly threshold; in a first instance of the third determination where the difference is within an anomaly threshold, classifying the data as not anomalous; and in a second instance of the third determination where the difference is not within an anomaly threshold, classifying the data as anomalous.

Making the second determination may also include: making a fourth determination regarding whether the data is within a calibration threshold for the inference model; in a first instance of the fourth determination where the data is within a calibration threshold, classifying the data as not useful; and in a second instance of the fourth determination where the data is outside the calibration threshold, classifying the data as useful.

The anomaly threshold may define a first range of values of the difference, the calibration threshold may define a second range of values of the difference, and the values of the difference within the first range may be larger than the values of the difference within the second range.

Using the data for inference model updating purposes may also include: treating the data as training data; and re-training the inference model using the training data to obtain an updated inference model, the updated inference model being more likely to generate inferences that discover anomalies given a changed environment which is now considered not anomalous.

Re-training the inference model may include: freezing a portion of the inference model prior to re-training the inference model to obtain a frozen portion of the inference model, and modifying portions of the inference model that are not part of the frozen portion of the inference model based on the data to obtain the updated inference model.

Freezing the portion of the inference model may render the frozen portion of the inference model unaffected by the re-training of the inference model.

The method may also include: obtaining an updated inference using the updated inference model, the updated inference being more likely to match the fixed output value when the data is non-anomalous than the inference.

Discarding the data may render the data unavailable to attackers desiring access to the data via compromise of the anomaly detector.

Initiating the process based on the data may also include: performing an action set including notifying a downstream consumer that the data is anomalous data.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Figure 1:
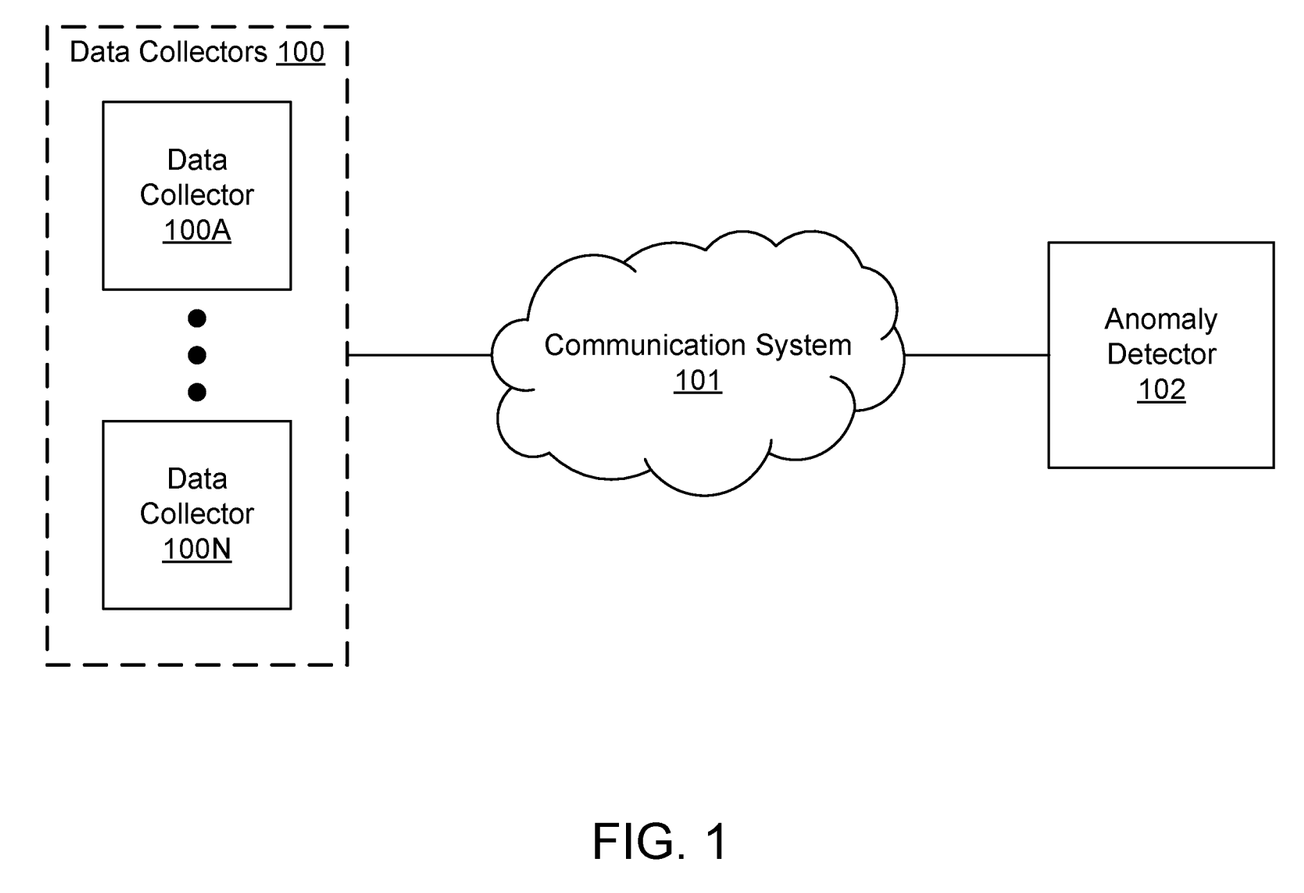
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services. The computer-implemented services may include any type and quantity of computer implemented services. For example, the computer-implemented services may include monitoring services (e.g., of locations), communication services, and/or any other type of computer-implemented services.

To provide memory-less anomaly detection services, the system may include anomaly detector 102. Anomaly detector 102 may provide all, or a portion of, the computer-implemented services. For example, anomaly detector 102 may provide computer-implemented services to users of anomaly detector 102 and/or other computing devices operably connected to anomaly detector 102. The computer-implemented services may include any type and quantity of services including, for example, memory-less anomaly detection.

To facilitate memory-less anomaly detection, the system may include one or more data collectors 100. Data collectors 100 may include any number of data collectors (e.g., 100A-100N). For example, data collectors 100 may include one data collector (e.g., 100A) or multiple data collectors (e.g., 100A-100N) that may independently and/or cooperatively facilitate the memory-less anomaly detection.

All, or a portion, of the data collectors 100 may provide (and/or participate in and/or support the) computer-implemented services to various computing devices operably connected to data collectors 100.

The computer-implemented services may include any type and quantity of services including, for example, memory-less anomaly detection in a distributed environment. Different data collectors may provide similar and/or different computer-implemented services.

When providing the computer-implemented services, the system of FIG. 1 may ascertain whether collected data is anomalous. To do so, the system of FIG. 1 may utilize an inference model that generates inferences usable to ascertain whether data is anomalous.

However, the quality of the computer-implemented services may depend on how well the system of FIG. 1 is able to ascertain whether data is anomalous. The inference model may be trained to map non-anomalous input values to a fixed output value (e.g., a number other than zero). When encountering new data, the inference model may map non-anomalous data (previously unseen by the inference model during training or otherwise) to an output value other than the expected output value. In order to improve the anomaly detection capabilities of the inference model (so it is able to identify new non-anomalous data as non-anomalous), the inference model may be re-trained to obtain an updated inference model. However, hosting, operating, and re-training of the inference model may consume large quantities of computing resources (e.g., more computing resources than desirable for use by the device), may require large amounts of data to be stored on a device (e.g., training data and/or other data), and storing large amounts of data on the device may also leave the data vulnerable to malicious attacks by third parties (e.g., attackers who desire access to the data).

In general, embodiments disclosed herein may provide methods, systems, and/or devices for minimizing computing resource expenditure by devices in a distributed environment while performing anomaly detection and continuously updating inference models usable for the anomaly detection. To minimize computing resource expenditure during anomaly detection in data (and protect data from malicious attackers that may attempt to compromise devices storing copies of the data), the system of FIG. 1 may implement an inference model update framework and anomaly detection framework that allows (i) small amounts of data to be used for training and discarded thereby not requiring large amounts of data to be aggregated for training purposes, and (ii) data processed for anomaly detection purposes to be discarded after processing likewise reducing the amount of data subject to compromise by malicious attackers. The inference model utilized for anomaly detection may be trained to map input data to one output value and, therefore, may reduce storage requirements during inference generation due to the unsupervised nature of the inference model.

In addition, the inference model update framework may update inference models through a partial re-training process. Partial re-training of the inference model may utilize fewer computing resources (e.g., by only re-training a portion of the inference model rather than the entire inference model) than a complete re-training process.

To provide the above noted functionality, the system of FIG. 1 may include anomaly detector 102. Anomaly detector 102 may (i) determine whether data (e.g., obtained from data collectors 100 and/or by itself) includes anomalous data using an inference model, (ii) when non-anomalous data is identified, determine whether the non-anomalous data may be used to improve the anomaly detection capabilities of the inference model through re-training, (iii) when the non-anomalous data is determined as being usable to improve the anomaly detection capabilities of the inference model, obtain an updated inference model using the non-anomalous data, and/or (iv) discard the data after its use so that the data is not available to malicious attackers if anomaly detector 102 is compromised.

Figure 3A:
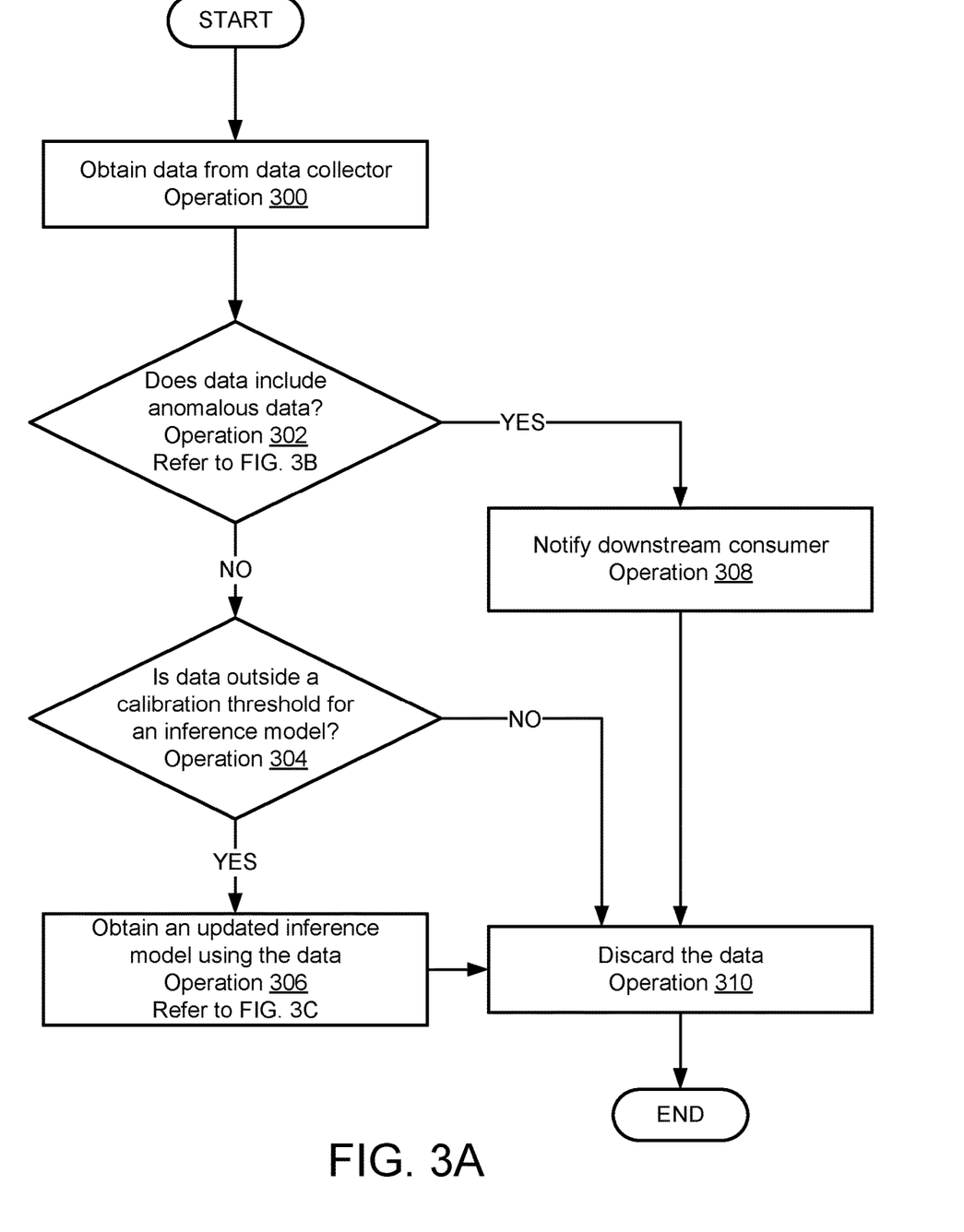
FIG. 3A shows a flow diagram illustrating a method of anomaly detection using an inference model in accordance with an embodiment.
Figure 3B:
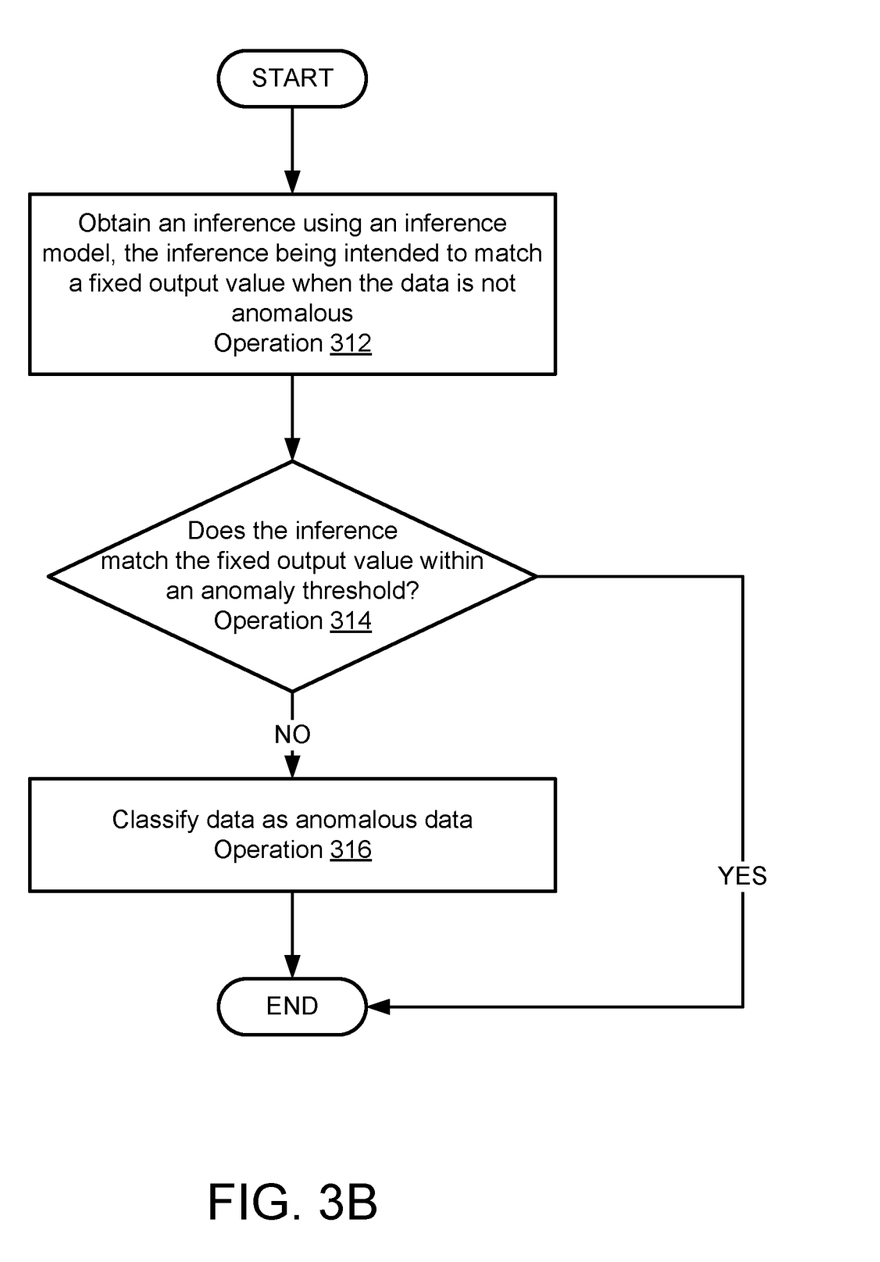
FIG. 3B shows a flow diagram illustrating a method of identifying anomalous data in accordance with an embodiment.
Figure 3C:
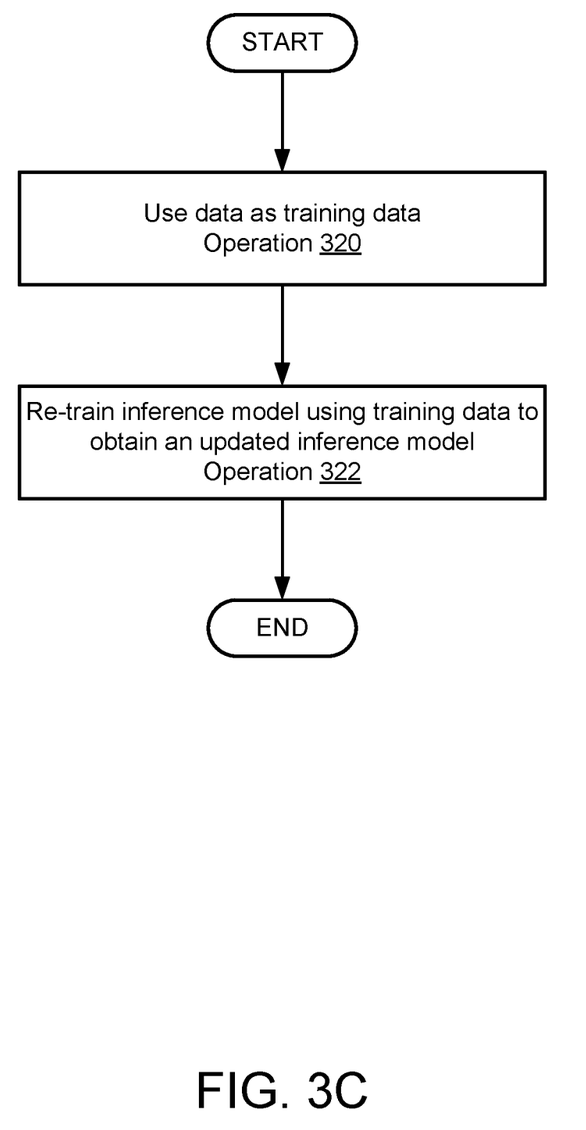
FIG. 3C shows a flow diagram illustrating a method of determining whether data is useful to improve an inference model through re-training in accordance with an embodiment.

When performing its functionality, anomaly detector 102 and/or data collectors 100 may perform all, or a portion, of the methods and/or actions shown in FIGS. 3A-3C.

Data collectors 100 and/or anomaly detector 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data collectors 100 and/or anomaly detector 102 are implemented using an internet of things (IoT) device, which may include a computing device. The IoT device may operate in accordance with a communication model and/or management model known to the anomaly detector 102, other data collectors, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2:
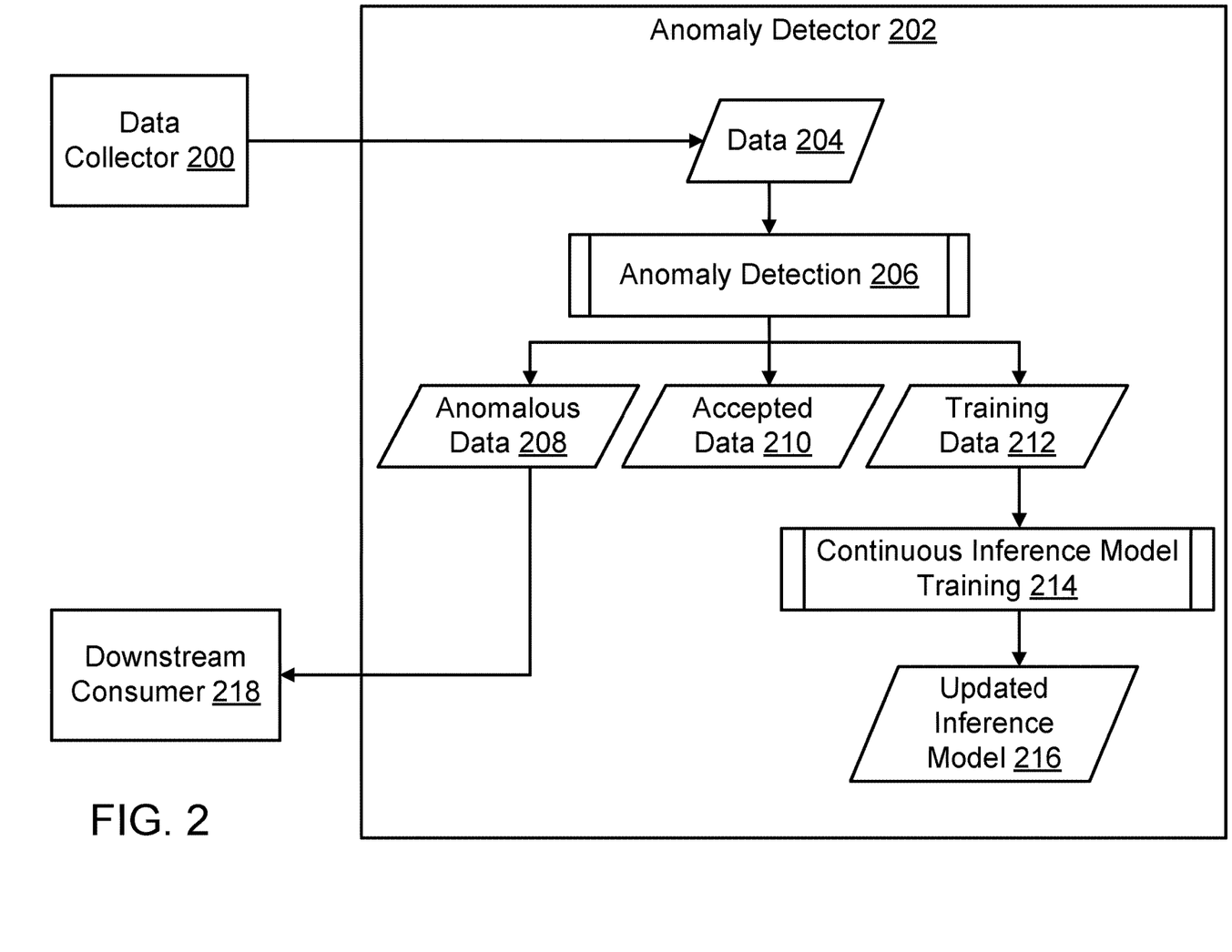
FIG. 2 shows a block diagram illustrating an anomaly detector over time in accordance with an embodiment.

To further clarify embodiments disclosed herein, diagrams illustrating data flows and/or processes performed in a system in accordance with an embodiment are shown in FIG. 2.

FIG. 2 shows a diagram of anomaly detector 202 interacting with data collector 200 and downstream consumer 218. Anomaly detector 202 may be similar to anomaly detector 102 shown in FIG. 1. In FIG. 2, anomaly detector 202 may be connected to data collector 200 and downstream consumer 218 via a communication system (not shown). Data collector 200 may be similar to any of data collectors 100. Communications between anomaly detector 202, data collector 200, and downstream consumer 218 are illustrated using lines terminating in arrows. In some embodiments, downstream consumer 218 may not be required.

As discussed above, anomaly detector 202 may perform computer-implemented services by processing data (e.g., via memory-less anomaly detection) in a distributed environment in which devices may be subject to malicious attacks.

To perform memory-less anomaly detection in the distributed environment, anomaly detector 202 may obtain data 204 from data collector 200. Data 204 may include any type and quantity of data. Anomaly detector 202 may perform anomaly detection 206 process on data 204 to determine whether data 204 includes anomalous data. Anomaly detection 206 process may include generating an inference using an inference model trained map non-anomalous data to a fixed output value (e.g., a number that is not zero). Anomaly detector 202 may generate a difference. The difference may be based on the inference and the fixed output value. The difference may be compared to an anomaly threshold. The anomaly threshold may indicate a first range of values of the difference. Any difference outside the anomaly threshold may indicate that the inference does not match the fixed output value and, therefore, the data may include anomalous data. Any difference within the anomaly threshold may indicate that the data does not include anomalous data. The anomaly threshold may be set by a downstream consumer 218, and any data with an associated difference outside the anomaly threshold may be considered unacceptable for the needs of downstream consumer 218. Therefore, downstream consumer 218 may desire to be notified of any anomalies in collected data. In some embodiments, anomaly detector 202 may respond directly to any anomalies and downstream consumer 218 may not be included in the system. Anomaly detector 202 may take different actions with respect to data 204 depending on whether data 204 includes anomalous data.

In a first example of the actions that anomaly detector 202 may take, consider a scenario in which the difference is outside the anomaly threshold and, therefore, may include anomalous data 208. When data 204 is classified as anomalous data 208, anomaly detector 202 may initiate performance of an action set. The action set may include sending the anomalous data 208 (and/or a notification of the presence of anomalies in data 204) to downstream consumer 218. By doing so, downstream consumer 218 may be notified of the existence of anomalous data 208 and may perform actions in response to this notification. Alternatively, anomaly detector 202 may perform the action set based on the presence of anomalous data 208. In this example, downstream consumer 218 may or may not be included in the system. Following this action set, anomalous data 208 may be discarded, transmitted to another device, and/or otherwise removed from anomaly detector 202. By doing so, anomalous data 208 may not be available to malicious attackers if anomaly detector 202 is compromised.

In a second example of the actions that anomaly detector 202 may take, consider a scenario in which the difference is within the anomaly threshold. When data 204 is classified as not including anomalous data, anomaly detector 202 may elect to use data 204 for training purposes if useful for training. To ascertain whether data 204 is useful for training, the difference may be compared to a calibration threshold. The calibration threshold may indicate a second range of values of the difference. Any difference outside the calibration threshold may indicate that data 204 is useful for training purposes and may be classified as training data 212. Any difference within the calibration threshold may indicate that data 204 is not useful for training purposes.

Continuing with the second example, if the difference is within the calibration threshold, then data 204 may be classified as accepted data 210. Accepted data 210 may be treated as not including anomalies and not useful for training (at least with respect to the level of improvement in the inference model that could be attained by training using accepted data 210 when weighed against the computing resource cost for the training). Accepted data 210 may be discarded, transmitted to another device, and/or otherwise removed from anomaly detector 202 so that, like anomalous data 208, accepted data 210 may not be available to malicious attackers should anomaly detector 202 be compromised.

When identified, training data 212 may be used for continuous inference model training 214 process. Continuous inference model training 214 process may include a partial re-training of the inference model. Partial re-training of the inference model may include freezing (e.g., rendering unaffected by the re-training) a portion of the inference model. Therefore, only portions of the inference model not included in the frozen portion of the inference model may be modified during re-training. Partial re-training of the inference model may consume fewer computing resources than a complete re-training of the inference model, may reduce large changes in decisions boundaries of the inference model, and may facilitate discarding of data on a piece meal basis (e.g., by avoiding the need for establishing large training data sets through aggregation of large amounts of data that may be valued by a malicious attacker).

Continuous inference model training 214 process may generate an updated inference model 216 (e.g., by modifying the structure of the inference model). Updated inference model 216 may be used to generate inferences that better discover anomalies given a changed environment that is now considered non-anomalous. Following continuous inference model training 214 process, training data 212 may be discarded, transmitted to another device, and/or otherwise removed from anomaly detector 202 so that training data 212 may not be available to malicious attackers through compromise of anomaly detector 202.

By discarding all data (e.g., anomalous data 208, accepted data 210, and training data 212), no data may be stored on anomaly detector 202 for any significant duration of time. Therefore, malicious attackers attempting to compromise anomaly detector 202 may not be able to access any significant quantity of data in the event of an attack. Therefore, anomaly detection may be performed by anomaly detector 202 with improved security through continuous inference model updating and discarding of the training data. In addition, by only performing partial re-training of the inference model, fewer computing resources may be consumed to update the inference model.

In an embodiment, anomaly detector 202 is implemented using a processor adapted to execute computing code stored on a persistent storage that when executed by the processor performs the functionality of anomaly detector 202 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to perform anomaly detection in a distributed environment in which devices may be subject to malicious attacks. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of anomaly detection using an inference model in accordance with an embodiment is shown. The method may be performed, for example, by an anomaly detector, a data collector, and/or another device.

At operation 300, data is obtained from a data collector. The data collector may be any device (e.g., a data processing system) that collects data. For example, the data collector may include a sensor that collects data (e.g., temperature data, humidity data, or the like) representative of an ambient environment, a camera that collects images and/or video recordings of an environment, and/or any other type of component that may collect information about an environment or other source.

The obtained data may include the live data (e.g., temperature readings, video recordings, etc.), aggregated statistics and/or other representation of the data (e.g., an average temperature, portions of the video, etc.) to avoid transmitting large quantities of data over communication system 101, and/or any other types of information.

The data may be obtained from data collectors 100 continuously, at regular intervals, in response to a request from anomaly detector 102, and/or in accordance with any other type of data collection scheme. For example, data collector 100A may include a camera that records continuous video of a property. The owners of the property may wish to be notified if any persons appear on the property outside the hours of 7:00 AM to 7:00 PM. Therefore, the video recordings collected during the hours of 7:00 PM to 7:00 AM may be selected by the data collector and transmitted to the anomaly detector for anomaly detection (e.g., identification of persons on the property outside the accepted times of 7:00 AM to 7:00 PM). The video recordings may be transmitted, for example, once per day after the time period has elapsed (e.g., at 7:00 AM). Following receipt of the data, the anomaly detector 102 may determine whether the data includes anomalous data as described below.

At operation 302, the anomaly detector 102 determines whether the data includes anomalous data. The anomaly detector 102 may determine whether the data includes anomalous data using the data and an inference generated by an inference model. Anomalous data may be data that deviates from typical data by a certain degree. Anomalous data may include, for example, an identification of a person at a particular location where the corresponding inference indicates that no person should be located. For additional details regarding anomaly detection, refer to FIG. 3B.

If the data includes anomalous data, the method may proceed to operation 308. If the data does include anomalous data, the method may proceed to operation 304.

At operation 308, a downstream consumer is notified that the data may include anomalous data. The downstream consumer may be any entity desiring to be notified of anomalies in the data collected by the data collector. For example, the downstream consumer may be the owner of the property, a security team, and/or any other entity that may respond to the presence of anomalous data in the data. The downstream consumer may be notified by sending one or more messages (e.g., an email alert, a text message alert, an alert through an application on a device) to the downstream consumer. The messages may include information (e.g., that the data is anomalous) regarding the data, a copy of the data itself, and/or other information. Other actions (e.g., initiating an alarm, automatically shutting a security door, and/or processes) may be performed when anomalous data is identified without departing from embodiments disclosed herein. Alternatively, the downstream consumer may be the anomaly detector 102 itself, and the anomaly detector 102 may take action in response to the anomaly without notifying an additional entity of the presence of the anomaly.

At operation 310, the data is discarded. The data may be discarded to secure against data being accessed by a malicious attacker attempting to compromise an anomaly detector. The data may be discarded immediately following the action set described in operation 308, and/or may be discarded after a previously determined duration of time (e.g., twice per day, etc.).

Discarding data may include deleting the data, transmitting the data to a device at an offsite location to be archived, and/or transmitting the data to another device for other purposes (in net, resulting in no copies of the data being retained on the anomaly detector). The data may be discarded via other methods without departing from embodiments disclosed herein. By doing so, any unauthorized entity (e.g., a malicious attacker) gaining access to the anomaly detector 102 via a malicious attack would not be able to access any data (e.g., due to the data not being stored in any memory or storage on the compromised device).

Returning to operation 302, the method may proceed to operation 304 if the data does not include anomalous data. If the data does not include anomalous data, the data may (or may not) be useful to evaluate and/or improve the inference model through training, as described below.

At operation 304, it is determined whether the data is outside a calibration threshold for an inference model used to generate the inference to evaluate whether the data includes anomalous data in operation 302. Data within the calibration threshold may indicate that the inference model reliably maps non-anomalous data to a previously established fixed output value (e.g., a number that is not zero). Data within the calibration threshold may indicate, for example, that the inference model meets the requirements of a downstream consumer. Data outside the calibration threshold (but that is not anomalous) may indicate that the inference model may be improved using the data to a significant enough degree that it outweighs the computing resource cost for updating the inference model. If the data is within the calibration threshold, the inference model may not use the data for training, and the data may be discarded as described with respect to operation 310 below. If the data is outside the calibration threshold, the method may proceed to operation 306 and the data may be use for training to obtain an updated inference model. Refer to FIG. 2 for additional details regarding the calibration threshold.

At operation 306, an updated inference model is obtained using the data. To obtain an updated inference model, the anomaly detector may treat the data as training data and may re-train the inference model to obtain the updated inference model. The retraining may be partial retraining where only the data is used to update the inference model. The updated inference model may be more likely to map new non-anomalous data to the previously established fixed output value for non-anomalous data than the inference model. Following re-training of the inference model, the data may be discarded as described with respect to operation 310. Refer to FIG. 3C for additional details regarding obtaining an updated inference model.

The method may end following operation 310.

Using the method illustrated in FIG. 3A, a system in accordance with embodiments disclosed herein may provide for anomaly detection with a continuously updated inference model while reducing the risk of undesired disclosure of data to malicious attackers.

Turning to FIG. 3B, a flow diagram illustrating a method of identifying anomalous data in accordance with an embodiment is shown. The operations in FIG. 3B may be an expansion of operation 302 in FIG. 3A.

Figure 4:
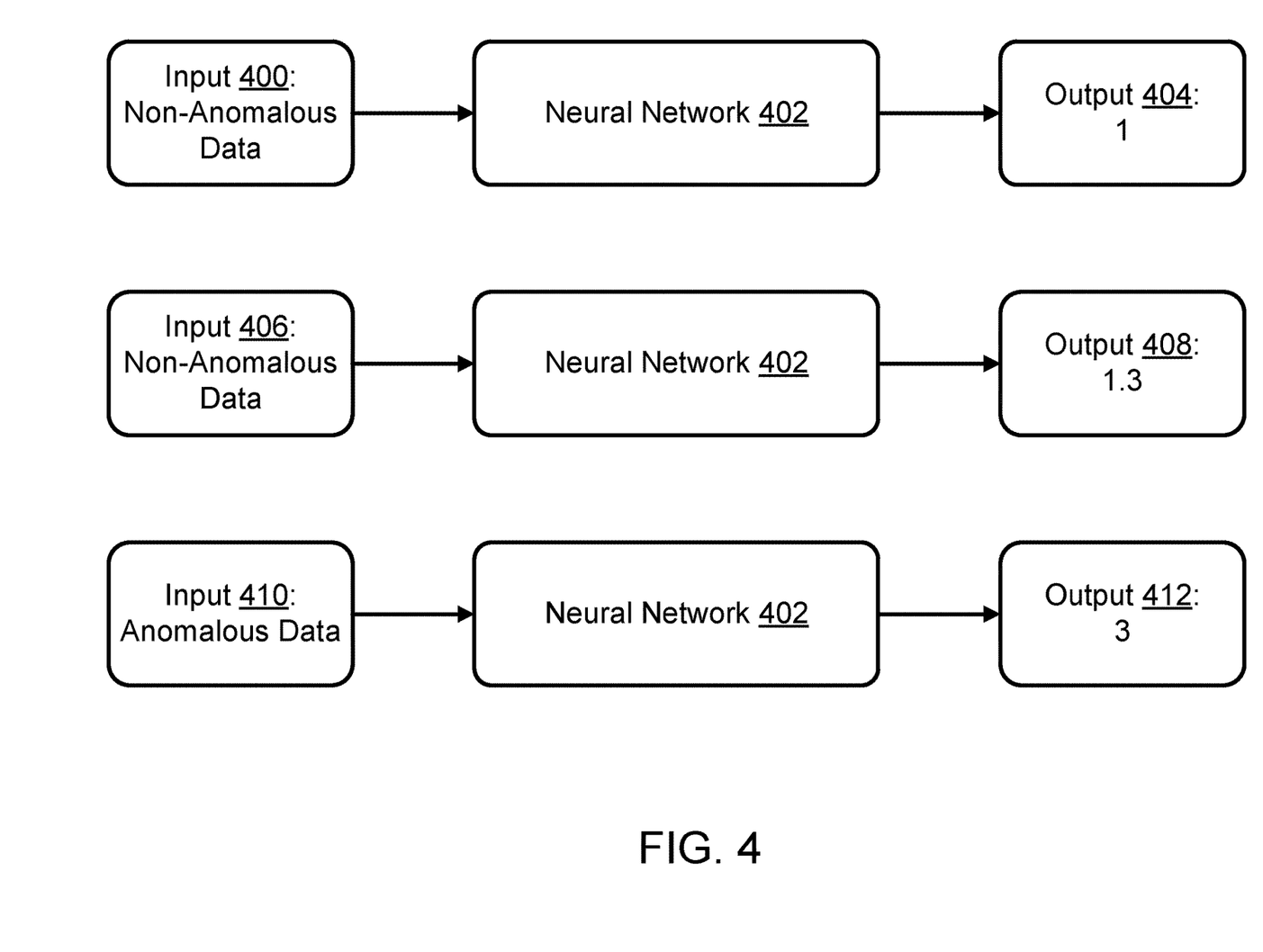
FIG. 4 shows an example neural network inference model in accordance with an embodiment.

At operation 312, an inference is obtained using an inference model. The inference may be intended to map to a previously established fixed output value (within a threshold) when the data is not anomalous. An output value that does not match the fixed output value within this threshold may indicate the presence of an anomaly in the data. The inference model may be, for example, a machine learning model (e.g., a neural network) and/or any other type of predictive model trained to identify anomalies in data obtained from data collectors 100. Refer to FIG. 4 for additional details regarding the inference model. The inference model may be trained using anomaly detection training data (not shown) to obtain an initially trained model. Anomaly detection training data may include a labeled dataset of data (e.g., including both anomalous and non-anomalous data) or may be unlabeled. For example, the anomaly detection training data may include frames of a video recording displaying a view of the property with no person present during certain times of the day and frames of the video recording displaying a few persons present during other times of the day. These frames may be labeled as including an expected number of persons within the frames (some or none depending on the frames). Therefore, the inference model may be trained to generate a fixed output value (e.g., 1 or any other value that is not zero) when the data is non-anomalous (e.g., video frames that include a few persons or no persons, depending on the time of the day). The inference may be used in conjunction with the data to determine whether an anomaly is present in the data as described below.

At operation 314, it is determined whether the inference matches the designated fixed output value within an anomaly threshold. To do so, the anomaly detector may first generate a difference. The difference may be based on the inference and the fixed output value. The anomaly threshold may define a first range of values of the difference. If the difference is within the anomaly threshold, the difference may not be considered large enough to indicate an anomaly. However, if the difference is outside the anomaly threshold, the difference may be considered too large to be non-anomalous and the data may be classified as anomalous, as shown in operation 316. For example, a frame of a video recording showing a person on the property may generate an output value with a large enough difference from the fixed output value (e.g., indicating that no persons should be present at that time) to be classified as an anomaly.

If it is determined that the data matches the inference within the anomaly threshold, then the method may end following operation 314. If not, the method may proceed to operation 316.

At operation 316, the data may be classified as anomalous data. Data may be classified as anomalous data by, for example, labeling (e.g., flagging) the data as being anomalous, initiating performance of various actions in response to the data being classified as being anomalous, and/or via other methods.

The method may end following operation 316.

Turning to FIG. 3C, a flow diagram illustrating a method of determining whether data is useful to improve an inference model through re-training in accordance with an embodiment is shown. The operations in FIG. 3C may be an expansion of operation 306 in FIG. 3A.

At operation 320, the data may be used as training data. The data may be used as training data by labeling it as training data for ingest into a training process for an inference model.

At operation 322, the inference model is re-trained to obtain an updated inference model. The inference model may be retrained using a partial re-training process. The partial re-training process may include freezing (e.g., rendering unaffected by the re-training process) a portion of the inference model. The frozen portion may be chosen randomly during each instance of re-training. The size of the frozen portion may be selected via any method (e.g., heuristically, deterministically based on characteristics of the inference model such as size, accuracy level, etc.). For example, the anomaly detector 102 may freeze a random 75% of the inference model during each re-training process. Therefore, only the portion of the inference model not included in the frozen portion (e.g., the remaining 25% in this example) may be modified during re-training of the inference model.

In an embodiment, the inference model is re-trained by (i) freezing some of the parameters of a neural network (e.g., weights of connections between neurons), (ii) establishing an objective function that optimizes for the machine learning model to output the data for a given input, and (iii) iteratively modifying the parameters that are not frozen until the objective function is optimized. The re-training may be performed via other methods depending on the type of inference model (e.g., other than a neural network) and/or other factors without departing from embodiments disclosed herein.

Re-training the inference model may generate an updated inference model. The updated inference model may be used in place of the inference model and no copies of the inference model may be retained on the anomaly detector 102. By doing so, storage resources may be freed (e.g., by not retaining old copies of inference models) and the most up-to-date version of the inference model may be the only version of the inference model available for use. Therefore, the anomaly detection capabilities of the inference model may be continuously improved by anomaly detector 102 during collection of data and detection of anomalies in the data.

The method may end following operation 322.

Turning to FIG. 4, three examples are shown of input data being mapped to a single output value using a neural network inference model (neural network 402). In these examples, neural network 402 is trained to map non-anomalous input data to a fixed output value of 1. Therefore, any non-anomalous data used as an ingest for neural network 402 will likely generate an output of 1, or be close to 1 depending on how well the training data used to train the neural network inference model covers the full range of non-anomalous ingest data.

In a first example (the topmost section of FIG. 4), input 400 includes non-anomalous data. The non-anomalous data is treated as the ingest for neural network 402 and output 404 of 1 is generated. Therefore, in this first example, neural network 402 operates as intended and classifies output 404 as non-anomalous data.

In a second example (the middle section of FIG. 4), input 406 includes non-anomalous data. However, input 406 may include data never before seen by neural network 402 (during training or otherwise). Therefore, even though the input 406 includes non-anomalous data, the neural network 402 generates output 408 of 1.3. As this output is not 1, an anomaly detector hosting the neural network 402 (not shown) may determine whether output 408 includes an anomaly. To do so, the anomaly detector may compare output 408 to a series of thresholds. A first threshold may be an anomaly threshold dictating that any output value over 2 or below 0 includes an anomaly. As output 408 does not include a value over 2 or below 0, the anomaly detector may determine that output 408 does not include an anomaly. However, the anomaly detector may compare output 408 to a second threshold (a calibration threshold). The calibration threshold may dictate that any output value between 1.1 and 2 (or between 0.9 and 0) may include non-anomalous data unknown to neural network 402. The anomaly detector may consider values between 1 and 1.1 (and between 1 and 0.9) as non-anomalous in accordance with the current training of the neural network 402. An output value outside the calibration threshold (but within the anomaly threshold) may include data useful for re-training of neural network 402 (in order to train neural network 402 to recognize non-anomalous data in potentially new situations and/or environments). Therefore, the anomaly detector may choose to re-train neural network 402 using data included in input 406.

In a third example (the lowest section of FIG. 4), input 410 includes anomalous data. The anomalous data is treated as the ingest for neural network 402 and output 412 of 3 is generated. The anomaly detector may compare output 412 to the anomaly threshold and may determine that output 412 contains anomalous data (e.g., via being outside the anomaly threshold of 2). The anomaly detector may perform an action set based on the anomalous data, may inform a downstream consumer of the anomalous data, and/or may perform other actions as needed to address the presence of anomalous data in input 410.

Figure 5:
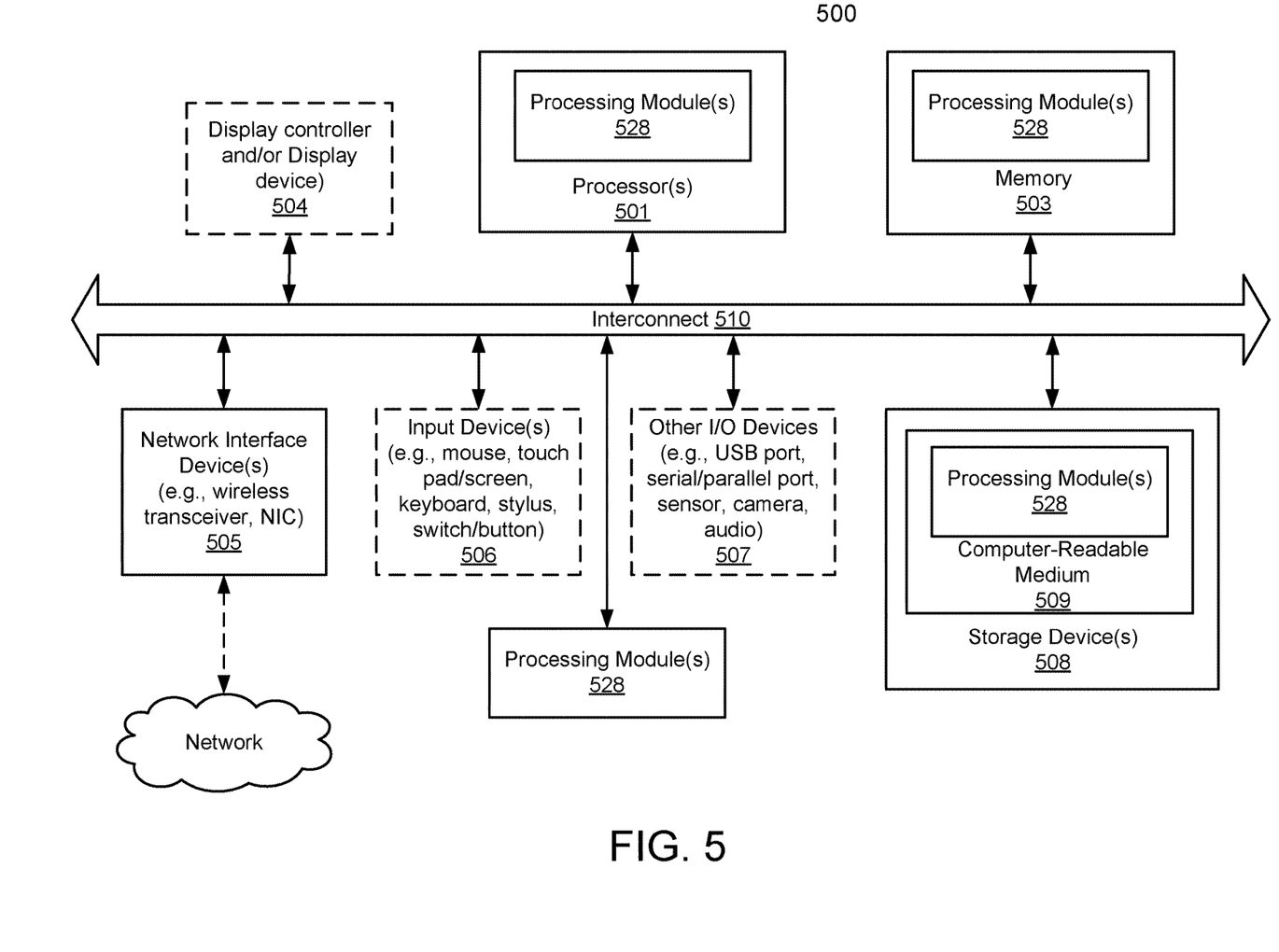
FIG. 5 shows a block diagram illustrating a data processing system in accordance with an embodiment.

Any of the components illustrated in FIGS. 1-4 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of processing data, the method comprising:
obtaining, by an anomaly detector, data from a data collector, the anomaly detector being a computing device;
obtaining, by the anomaly detector, an inference using an inference model, the inference being intended to match a fixed output value when the data is not anomalous;
making a first determination, by the anomaly detector, regarding whether the data is anomalous, the first determination being based at least in part on the inference;
in a first instance of the first determination where the data is anomalous, initiating a process based on the data being anomalous, the process comprising discarding the data from the computing device making up the anomaly detector; and
in a second instance of the first determination where the data is not anomalous:
making a second determination, as part of a single anomaly detection process performed by the anomaly detector where the data obtained by the anomaly detector from the data collector for the anomaly detection process is always discarded from the computing device regardless of whether the data is anomalous or not anomalous, regarding whether the data is useful to improve anomaly detection capabilities of the inference model through training, the single anomaly detection process further comprising the first determination;
in a first instance of the second determination where the data is useful, re-training, by the anomaly detector, the inference model using the data as training data to obtain an updated inference model and discarding the data; and
in a second instance of the second determination where the data is not useful, discarding the data without using the data for inference model updating purposes.

2. The method of claim 1, wherein making the first determination further comprises:
obtaining a difference, the difference being based on the inference and the fixed output value;
making a third determination regarding whether the difference is within an anomaly threshold;
in a first instance of the third determination where the difference is within an anomaly threshold, classifying the data as not anomalous; and
in a second instance of the third determination where the difference is not within the anomaly threshold, classifying the data as anomalous.

3. The method of claim 2, wherein making the second determination further comprises:
making a fourth determination regarding whether the data is within a calibration threshold for the inference model;
in a first instance of the fourth determination where the data is within the calibration threshold, classifying the data as not useful; and
in a second instance of the fourth determination where the data is outside the calibration threshold, classifying the data as useful.

4. The method of claim 3, wherein the anomaly threshold defines a first range of values of the difference, the calibration threshold defines a second range of values of the difference, and the values of the difference within the first range are larger than the values of the difference within the second range.

5. The method of claim 4, wherein using the data for inference model updating purposes further comprises:
treating the data as training data; and
re-training the inference model using the training data to obtain an updated inference model, the updated inference model being more likely to generate inferences that discover anomalies given a changed environment which is now considered not anomalous.

6. The method of claim 5, wherein re-training the inference model comprises:
freezing a portion of the inference model prior to re-training the inference model to obtain a frozen portion of the inference model, and
modifying portions of the inference model that are not part of the frozen portion of the inference model based on the data to obtain the updated inference model.

7. The method of claim 6, wherein freezing the portion of the inference model renders the frozen portion of the inference model unaffected by the re-training of the inference model.

8. The method of claim 7, further comprising:
obtaining an updated inference using the updated inference model, the updated inference being more likely to match the fixed output value when the data is non-anomalous than the inference.

9. The method of claim 1, wherein discarding the data removes the data entirely from the computing device, rendering the data unavailable to attackers desiring access to the data via compromise of the anomaly detector.

10. The method of claim 9, wherein initiating the process based on the data further comprises:
performing an action set comprising notifying a downstream consumer that the data is anomalous data.

11. A non-transitory machine-readable medium having instructions stored therein, which when executed by a processor, cause the processor to perform operations for processing data, the operations comprising:
obtaining, by an anomaly detector, data from a data collector, the anomaly detector being a computing device and the computer device comprising the processor;
obtaining, by the anomaly detector, an inference using an inference model, the inference being intended to match a fixed output value when the data is not anomalous;
making a first determination, by the anomaly detector, regarding whether the data is anomalous, the first determination being based at least in part on the inference;
in a first instance of the first determination where the data is anomalous, initiating a process based on the data being anomalous, the process comprising discarding the data from the computing device making up the anomaly detector; and
in a second instance of the first determination where the data is not anomalous:
making a second determination, as part of a single anomaly detection process performed by the anomaly detector where the data obtained by the anomaly detector from the data collector for the anomaly detection process is always discarded from the computing device regardless of whether the data is anomalous or not anomalous, regarding whether the data is useful to improve anomaly detection capabilities of the inference model through training, the single anomaly detection process further comprising the first determination;

in a first instance of the second determination where the data is useful, re-training, by the anomaly detector, the inference model using the data as training data to obtain an updated inference model and discarding the data; and in a second instance of the second determination where the data is not useful, discarding the data without using the data for inference model updating purposes.

12. The non-transitory machine-readable medium of claim 11, wherein making the first determination further comprises:

obtaining a difference, the difference being based on the inference and the fixed output value;

making a third determination regarding whether the difference is within an anomaly threshold;

in a first instance of the third determination where the difference is within an anomaly threshold, classifying the data as not anomalous; and in a second instance of the third determination where the difference is not within an anomaly threshold, classifying the data as anomalous.

13. The non-transitory machine-readable medium of claim 12, wherein making the second determination further comprises:

making a fourth determination regarding whether the data is within a calibration threshold for the inference model;

in a first instance of the fourth determination where the data is within a calibration threshold, classifying the data as not useful; and in a second instance of the fourth determination where the data is outside the calibration threshold, classifying the data as useful.

14. The non-transitory machine-readable medium of claim 13, wherein the anomaly threshold defines a first range of values of the difference, the calibration threshold defines a second range of values of the difference, and the values of the difference within the first range are larger than the values of the difference within the second range.

15. The non-transitory machine-readable medium of claim 11, wherein discarding the data removes the data entirely from the computing device, rendering the data unavailable to attackers desiring access to the data via compromise of the anomaly detector.

16. The non-transitory machine-readable medium of claim 15, wherein initiating the process based on the data further comprises:

performing an action set comprising notifying a downstream consumer that the data is anomalous data.

17. A data processing system, comprising:

a processor; and a memory coupled to the processor to store instructions, which when executed by the processor, cause the processor to perform operations for processing data, the operations comprising:

obtaining, by an anomaly detector of the data processing system, data from a data collector;

obtaining, by the anomaly detector, an inference using an inference model, the inference being intended to match a fixed output value when the data is not anomalous;

making a first determination, by the anomaly detector, regarding whether the data is anomalous, the first determination being based at least in part on the inference;

in a first instance of the first determination where the data is anomalous, initiating a process based on the data being anomalous, the process comprising discarding the data from the data processing system containing the anomaly detector; and in a second instance of the first determination where the data is not anomalous:

making a second determination, as part of a single anomaly detection process performed by the anomaly detector where the data obtained by the anomaly detector from the data collector for the anomaly detection process is always discarded from the data processing system regardless of whether the data is anomalous or not anomalous, regarding whether the data is useful to improve anomaly detection capabilities of the inference model through training, the single anomaly detection process further comprising the first determination;

in a first instance of the second determination where the data is useful, re-training, by the anomaly detector, the inference model using the data as training data to obtain an updated inference model and discarding the data; and in a second instance of the second determination where the data is not useful, discarding the data without using the data for inference model updating purposes.

18. The data processing system of claim 17, wherein making the first determination further comprises:

obtaining a difference, the difference being based on the inference and the fixed output value;

making a third determination regarding whether the difference is within an anomaly threshold;

in a first instance of the third determination where the difference is within an anomaly threshold, classifying the data as not anomalous; and in a second instance of the third determination where the difference is not within an anomaly threshold, classifying the data as anomalous.

19. The data processing system of claim 18, wherein making the second determination further comprises:

making a fourth determination regarding whether the data is within a calibration threshold for the inference model;

in a first instance of the fourth determination where the data is within a calibration threshold, classifying the data as not useful; and in a second instance of the fourth determination where the data is outside the calibration threshold, classifying the data as useful.

20. The data processing system of claim 17, wherein discarding the data removes the data entirely from the data processing system, rendering the data unavailable to attackers desiring access to the data via compromise of the anomaly detector.

* * * * *